United States Patent
Chiang et al.

(10) Patent No.: US 7,809,069 B1
(45) Date of Patent: Oct. 5, 2010

(54) METHOD AND SYSTEM FOR SIDELOBE REDUCTION USING ANTIPODAL SIGNALING

(75) Inventors: Johann Chiang, Austin, TX (US); Kevin Shelby, Austin, TX (US)

(73) Assignee: Alereon, Inc., Austin, TX (US)

( * ) Notice: Subject to any disclaimer, the term of this patent is extended or adjusted under 35 U.S.C. 154(b) by 869 days.

(21) Appl. No.: 11/652,934

(22) Filed: Jan. 12, 2007

Related U.S. Application Data

(60) Provisional application No. 60/759,192, filed on Jan. 13, 2006.

(51) Int. Cl.
*H04L 27/28* (2006.01)
(52) U.S. Cl. ..................................................... 375/260
(58) Field of Classification Search ................ 375/130, 375/131, 132, 135, 138, 139, 140, 146, 259, 375/260
See application file for complete search history.

(56) References Cited

U.S. PATENT DOCUMENTS

| | | | | |
|---|---|---|---|---|
| 2003/0067963 A1* | 4/2003 | Miller et al. | ................. | 375/130 |
| 2005/0058217 A1* | 3/2005 | Sandhu et al. | .............. | 375/267 |
| 2005/0276310 A1* | 12/2005 | Choi et al. | .................. | 375/130 |
| 2007/0071115 A1* | 3/2007 | Suzuki et al. | ............... | 375/260 |

* cited by examiner

*Primary Examiner*—Sam K Ahn
(74) *Attorney, Agent, or Firm*—Sprinkle IP Law Group

(57) ABSTRACT

Embodiments of the present invention provide a system and method for reducing the power of a UWB signal over a desired range of frequencies. Embodiments of the present invention reduce power over the desired range of frequencies by reducing the sidelobe power of tones comprising the UWB signal. Embodiments of the present invention reduce sidelobe power by inverse signaling one or more tones comprising the UWB signal.

24 Claims, 7 Drawing Sheets

METHOD AND SYSTEM FOR SIDELOBE REDUCTION USING ANTIPODAL SIGNALING

RELATED APPLICATIONS

This application claims priority to U.S. Provisional Patent Application Ser. No. 60/759,192 by inventors Johann Chiang and Kevin Shelby, entitled "Method and System for Adjacent Frequency Coding" filed on Jan. 13, 2006, the entire contents of which are hereby expressly incorporated by reference for all purposes.

TECHNICAL FIELD OF THE INVENTION

The invention relates in general to methods, systems and apparatuses for shaping the energy spectrum of a UWB signal. More particularly, the invention relates to methods, systems and apparatuses for shaping an energy spectrum of a UWB signal through the notching of the energy spectrum of the UWB signal. Even more particularly, the invention relates to increasing the depth of notches in an energy spectrum by decreasing or minimizing sidelobe contributions using antipodal signaling or adjacent frequency coding techniques.

BACKGROUND

Recently, wireless data, entertainment and mobile communications technologies have become increasingly prevalent, particularly in the household environment. The convergence of these wireless data, entertainment and mobile communications within the home and elsewhere has created the need for merging many disparate devices into a single wireless network architecture capable of seamlessly supporting and integrating the requirements of all of these devices. Seamless connectivity and rapid transfer of data, without confusing cables and wires for various interfaces that will not and cannot talk to each other, is a compelling proposition for a broad market.

To that end, communication industry consortia such as the MultiBand OFDM Alliance (MBOA), Digital Living Network Alliance (DLNA) and the WiMedia Alliance are establishing design guidelines and standards to ensure interoperability of these wireless devices. The WiMedia Alliance has promulgated such a guideline and standard, hereinafter referred to as the WiMedia Specification.

Although it began as a military application dating from the 1960s, UWB has recently been utilized as a high data rate (480+Mbps), short-range (up to 20 meters) technology that is well suited to emerging applications in the consumer electronics, personal computing and mobile markets. When compared to other existing and nascent technologies capable of wireless connectivity, the performance benefits of UWB are compelling. For example, transferring a 1 Gbyte file full of vacation pictures from a digital camera to a computer take merely seconds with UWB compared to hours using other currently available, technologies (i.e. Bluetooth) and consume far less battery power in doing so.

In typical UWB, data is transmitted using a plurality of signals, the plurality of signals are transmitted using a plurality of frequencies within a UWB frequency range. The signal transmitted at any one frequency is referred to as a tone. Thus, a typical UWB signal is comprised of a plurality of tones, each tone associated with a particular frequency.

Because UWB, by definition, is spread over a broad spectral range, the power spectral density of a signal utilized by a UWB device is usually very low, and hence, usually results in low incidence of interference with other systems which may be utilizing the same bandwidth as the UWB device or system.

Power spectral density, however, may be a function of distance. Consequently, if a UWB device is in close proximity to another wireless system, the potential for interference between the UWB device and the wireless system cannot be neglected.

Additionally, there may be frequency bands within a UWB channel where it is important to suppress interference. For example, some existing UWB spectrum allocations encompass frequencies used by C-Band satellite downlinks. Thus, there is a potential for UWB systems to interfere with the signals of these and other types of systems.

Thus, the ability to control the shape and energy of a UWB signal is important for many reasons, including regulatory, commercial and interference. Therefore, there is a need to develop methods and techniques for controlling or shaping the power spectrum of a UWB signal or waveform.

SUMMARY OF THE INVENTION

One or more of the problems outlined above may be solved by the various embodiments of the invention. Broadly speaking, embodiments of the invention comprise methods and systems for controlling or shaping the power spectrum of a UWB signal or waveform, in particular, embodiments of the invention regard methods or systems for reducing UWB signal power over a desired range of frequencies. In some embodiments, a linear transformation is utilized to effect antipodal signaling such that the sidelobe power of tones comprising a transmitted UWB signal is reduced. The linear transformation may be chosen such that one or more tones are inverted. In one embodiment alternate tones may be inverted. In one embodiment, a linear transformation is expressed as a matrix which is applied to adjacent tones. Entries of the matrix may be chosen such that overlapping sidelobe power cancels.

One embodiment of the present invention is method for shaping the power spectrum of a UWB signal, comprising generating a plurality of tones, mapping one or more tones such that an inverted tone is adjacent to a non-inverted tone and forming a UWB signal using the tones. The above method may further comprise receiving the UWB signal and demapping the inverted tone.

Embodiments of the present invention provide the advantage that signal power over a desired range of frequencies is reduced. Embodiments of the present invention provide the additional advantage that the reduction of signal power can be more effective relative to other methods of reducing signal power. Embodiment of the present invention provide further advantages in that the present invention is straight-forward to implement relative to other methods of reducing sidelobe power, can readily be used in conjunction with the WiMedia Specification and has little or no effect on multipath performance.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF FIGURES

A more complete understanding of the present invention and the advantages thereof may be acquired by referring to the following description, taken in conjunction with the accompanying drawings in which like reference numbers indicate like features and wherein.

DETAILED DESCRIPTION

Figure 1:
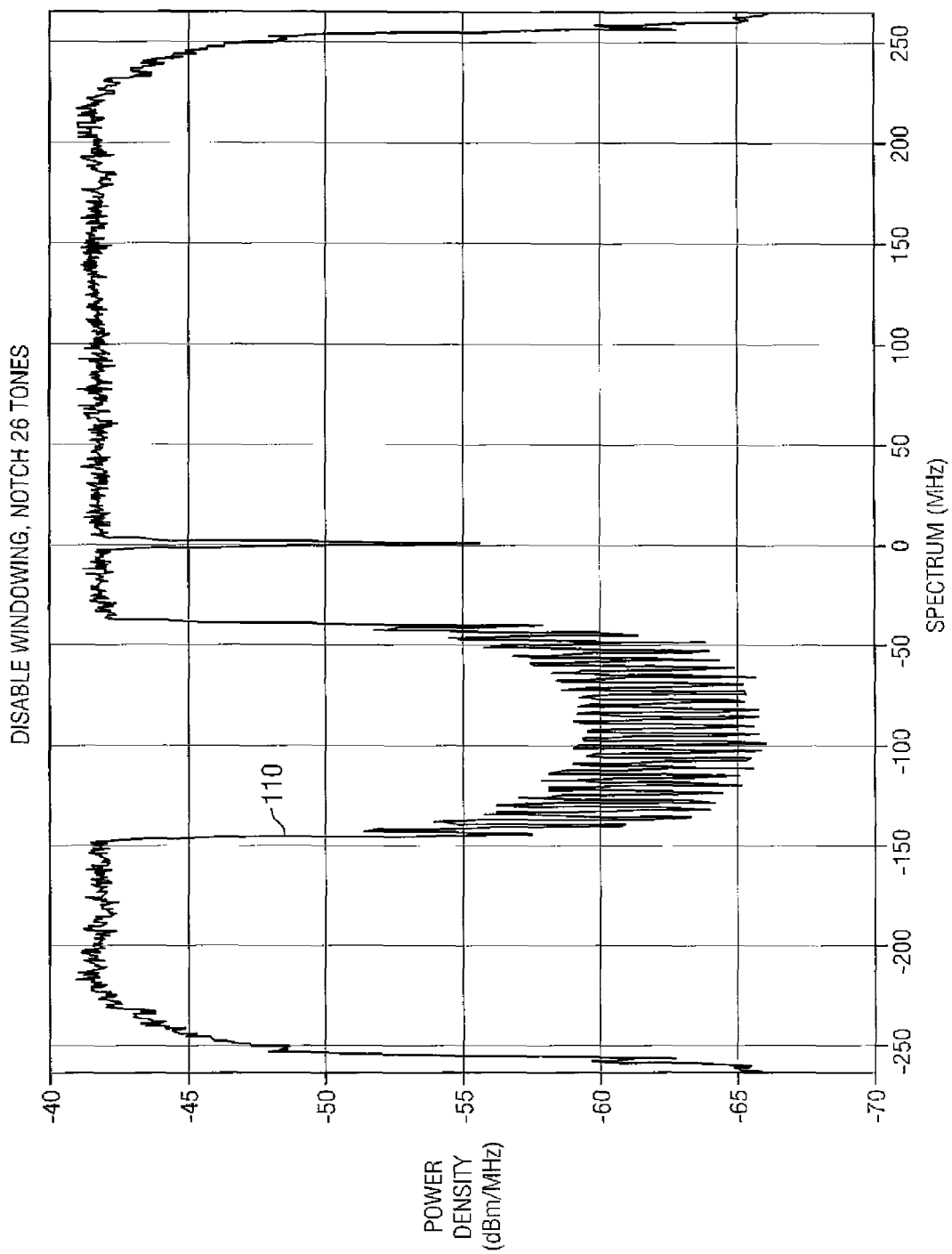
FIG. 1 is a graphical representation of notching the power spectrum of a UWB signal.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

The WiMedia Alliance has developed a standard platform for wireless communication using Ultra-Wideband (UWB) technology. The requirements of this platform are delineated in the WiMedia Specification. While providing a standard basis for wireless communication using UWB technology, the WiMedia Specification promulgated by the WiMedia Alliance is being continually developed by members of the Alliance to incorporate innovations which enhance the usefulness and functionality of WiMedia UWB wireless communication systems.

To this end, members of the Alliance are enhancing the functionality of WiMedia UWB wireless technology by developing methods which allow WiMedia UWB wireless systems to avoid interfering with radio systems which use frequencies in or near the broad swath of frequencies which lie within the frequency range used by UWB wireless systems. WiMedia UWB wireless technology is also being enhanced by the development of signal detect and avoidance: WiMedia UWB wireless radio functionality has been developed which enables WiMedia UWB wireless radio systems to detect signals and noise. If signals or noise is detected, a WiMedia UWB wireless system can then avoid using the frequencies upon which the signals or noise was detected. The purpose of this functionality is to enable WiMedia UWB wireless radio systems to operate without interfering with other wireless systems and to avoid frequencies plagued by noise. While signal detection and avoidance has been discussed with regard to WiMedia UWB wireless systems, it is to be understood that signal detection and avoidance can be used in other communication systems with similar results.

Embodiments of the invention encompass systems, methods and techniques for suppressing or reducing signal power over a desired range of frequencies. These methods and techniques can be used to reduce the interference between a UWB signal and other signals in a particular frequency range. It may be possible for such UWB systems to dynamically determine frequencies in the frequency range over which a UWB signal is transmitted on which there are noise or signals. The UWB system can then null tones at specific frequencies, so as to notch (i.e. suppress or reduce) the power of a transmitted UWB signal over specifically chosen frequency ranges to avoid interfering with the known or detected radio systems and noise.

An example of one embodiment of notching the UWB signal power is shown in FIG. 1. Tone nulling can be used to create a notch in a UWB signal over a desired range of frequencies. In FIG. 1, trace 110 exhibits a notch in the power spectrum from approximately −151 MHz to −48 MHz. As shown by trace 110, in a frequency range spanning approximately 51 MHz (e.g. from approximately −151 MHz to −48 MHz), the power has been reduced from over −43 dBm to less than −60 dBm at some frequencies—a drop of approximately 23 dB.

Nulling tones can be done dynamically, in response to signal or noise measurements, or the tone nulling can be applied to a fixed range of frequencies, or a combination of fixed tone nulls and dynamic tone nulling can be used. Thus it is possible for a UWB system to avoid detected signals and noise and to avoid interfering with frequencies known to be used by other radio systems.

Mere tone nulling alone, however, may not completely or adequately eliminate signal power over the desired frequency range, because in many UWB implementations, generating a tone produces sidelobes with an associated signal power at frequencies different from the frequency of the generated tone. As a result, sidelobes generated by producing tones may bleed-over into, or resonate within, the UWB frequency range over which it is desirable to reduce power.

The effects of this are shown by trace 110 of FIG. 1 which represents notching the power spectrum of a UWB signal: despite nulling tones, signal power still exists within the notched range of frequencies. For example, in FIG. 1, at approximately 100 MHz, trace 110 exhibits a power level exceeding −60 dBm. This is due in part to the signal power of sidelobes bleeding-over or resonating within the nulled tone frequencies. As graphically shown by trace 110, this has the effect of diminishing the interference-avoiding effects of tone nulling because the signal power of the sidelobes resonating in the frequency range of the notch (e.g. from approximately −151 MHz to −48 MHz) has the potential to interfere with other radio system signals in the frequency range over which it is desired to create a notch.

Because of the deleterious effects that sidelobes may have on notch depth, it may be helpful to cancel out, or reduce, the sidelobes of one or more tones in order that signal power in a certain frequency range may be further suppressed, or interference between adjacent tones reduced. Sidelobe reduction can have the effect of further reducing signal power in a notch relative to tone nulling alone, thus deepening the depth of the notch. Increasing notch depth reduces the likelihood that the UWB signal will interfere with radio systems operating on frequencies substantially within the notch. Increasing notch depth may also be necessary to comport with regulatory requirements. To ensure that WiMedia UWB wireless systems adhere to the regulatory requirements of various countries and do not interfere with the operability of pre-existing radio systems, it is desirable to use notching in conjunction with sidelobe suppression/reduction techniques to increase notch depth.

Antipodal signaling is one technique that can be used to reduce sidelobe power. It has been observed that sidelobe contributions for adjacent tones may be similar. If adjacent tones are transmitted together such that alternate tones are inverted, i.e. equal in amplitude but having opposite phase, overlapping sidelobe contributions from an inverted and a noninverted tone may cancel. An advantage of antipodal signaling is that inverse signaling inherently has no impact on multipath performance relative to other methods of reducing sidelobe power.

Figure 2:
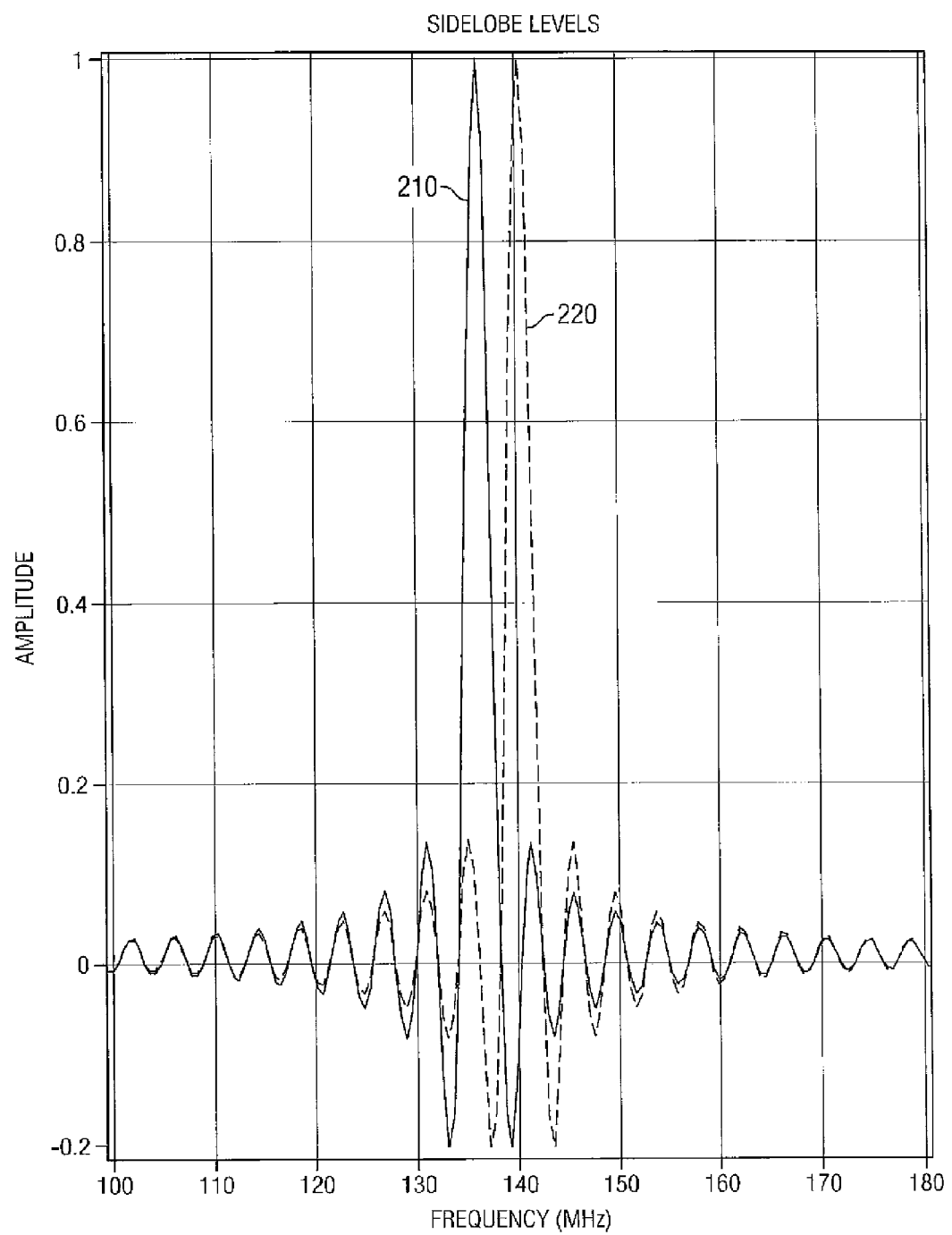
FIG. 2 is a graphical representation of two adjacent tones in the frequency domain.

FIG. 2 is a graph of two adjacent tones and illustrates how sidelobes of adjacent signals may overlap. Tone 220 is adjacent to tone 210. Sidelobes of tones 210 and 220 substantially overlap and are of comparable amplitude. Thus, if one of the tones is inverted, when the tones are combined into a UWB signal and transmitted, the sidelobes of the two adjacent tones may substantially cancel each other out.

One embodiment of antipodal signaling comprises reordering or mapping adjacent signals such that information on adjacent tones may be substantially the inverse of one another, this can be accomplished through the duplication and inversion of tones. For example, if signal $K=C_k$, then signal $K+1=-C_k$. This embodiment can yield significant sidelobe reduction for a tone or set of tones.

However, duplication of tones may result in a less than desirable tone mapping. The undesirable effects of tone duplication may affect the implementation of wireless receivers and may result in less than desirable performance characteristics, e.g. loss of time or frequency diversity, for embodiments of these implementations. In particular, the combination of duplication and inversion may have an adverse effect on frequency diversity: if there is a fade in a certain area, two adjacent tones may both be lost. This loss of tones may be referred to as tone erasure. In addition, WiMedia UWB wireless systems may be designed to comport with the WiMedia Specification and interact with other WiMedia systems. Duplication of tones may conflict with the WiMedia Specification or hinder inter-operability between WiMedia systems.

Thus, what is desired is to achieve substantial sidelobe cancellation or suppression through the inverse signaling of adjacent tones while avoiding tone erasure, maintaining compliance with the WiMedia Specification and ensuring inter-operability between WiMedia systems.

Embodiments of the systems and methods presented allow for the inversion of alternate tones and the cancellation of sidelobe energy without substantially altering a mapping of tones. Embodiments of such systems and methods readily co-exist with the WiMedia Specification and avoid WiMedia inter-operability problems.

Embodiments of the present invention allow tones which are adjacent in an original tone mapping to be mapped such that a tone is inverted relative to an adjacent tone. The relative proximity of tones to each other in frequency may not be affected by this inversion mapping. Thus, mapping to achieve antipodal signaling may be done by inverting alternate tones as opposed to duplicating a tone and inverting the duplicated tone. This inversion mapping results in antipodal signaling being substantially achieved. However, when the mapping is reversed, the tones are mapped back to substantially their original form. Thus antipodal signaling can be achieved substantially without changing any of the frequency diversity properties or any of the time diversity properties of an existing or original mapping. Another advantage is that the mapping may be easily undone and transmitted data readily recoverable at a receiver. A further advantage of this methodology is that it may be used in conjunction with the WiMedia Specification.

A mapping of tones can be effected through the application of a linear transformation. In one embodiment of the invention, antipodal signaling can be effectuated by mapping adjacent tones using a matrix. In one of embodiment, a mapping can be utilized so as to achieve substantial cancellation of mutually overlapping sidelobes in adjacent tones.

Figure 3:
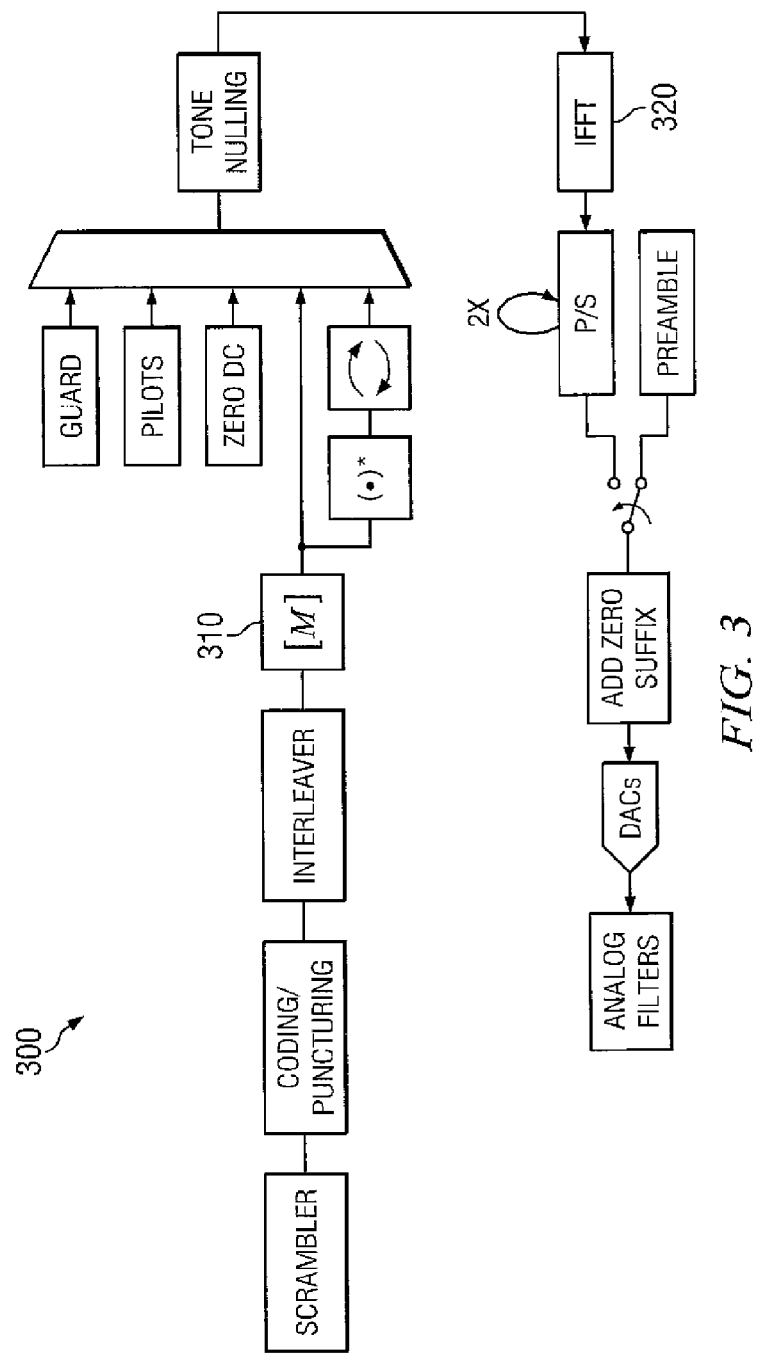
FIG. 3 is a block diagram of one embodiment of a transmitter capable of antipodal signaling in accordance with the present invention.

FIG. 3 illustrates a block diagram of an embodiment of a transmitter 300 which may transmit signals in accordance with the present invention. In transmitter 300, mapping logic 310 is operable to map tones such that antipodal signaling may be achieved. Mapping logic 310 is operable to map tones such that a tone is inverted relative to an adjacent tone. Thus, mapping logic 310 can be used to invert alternate tones, effecting inverse mapping. In transmitter 300, tones are inverse mapped with mapping logic 310 prior to Inverse Fast Fourier Transform (IFFT) 320. Mapping logic 310 effects a linear transformation which can be expressed as a matrix "M" (as shown in logic block 310). Because, in this embodiment, the linear transformation effected by mapping logic 310 occurs prior to IFFT 320, the inverse mapping can be considered to occur in the frequency domain. In some embodiments of the invention, to comport with the WiMedia Specification or achieve inter-operability, it may be helpful to generate a preamble prior to mapping with mapping logic 310 or processing with IFFT 320.

The following equation illustrates one embodiment of a linear transformation which can be applied to tones at transmitter 300. Matrix $[m_{11}\ m_{12};\ m_{21}\ m_{22}]$ is one embodiment of matrix M. Matrix $[x_a+jx_c;\ x_b+jx_d]$ represents an embodiment of a pair of tones.

$$\begin{bmatrix} y_n \\ y_{n+50} \end{bmatrix} = k_{mod} \begin{bmatrix} m_{11} & m_{12} \\ m_{21} & m_{22} \end{bmatrix} \begin{bmatrix} x_a + jx_c \\ x_b + jx_d \end{bmatrix}, n = [0:N_D/2-1] \quad [\text{Eq. 1}]$$

In this particular linear transformation, an original tone mapping is mapped using matrix M (e.g. $[m_{11}\ m_{12};\ m_{21}\ m_{22}]$) such that alternate tones are inverted, generating a plus-minus pattern. A plus-minus pattern is one in which a noninverted tone is followed by an inverted tone and an inverted tone is followed by a noninverted tone. One embodiment of matrix M is $[1\ -1;\ -1\ 1]$: this matrix can be applied to adjacent tones to effect the cancellation of over-lapping sidelobe portions of adjacent tones. The rows and columns of this embodiment of matrix M both sum to zero, indicating that use of such a linear operator may be useful in suppressing sidelobe contributions by effecting antipodal signaling.

However, because the rows of this embodiment of matrix M sum to zero, it will be additionally observed that when data content in adjacent tones of an original mapping is identical, there may be substantially complete tone erasure as in tone duplication antipodal signaling discussed above. This is because two substantially equal adjacent tones may both be lost through cancellation independent of channel fading. The probabilities of such tone erasure may be on the order of one in sixteen. To ameliorate the possibility of tone erasure, a matrix may be used in which one or more of the entries of the matrix is close to one (or negative one), or which approximates one (or negative one). Matrices having such entries may substantially avoid tone erasures while yielding significant sidelobe suppression or notch depth, as they substantially still achieve antipodal signaling.

Such an embodiment of matrix M is $[1\ -e^{j\pi/4};\ -1\ e^{j\pi/4}]$. In this embodiment of matrix M, the use of imaginary numbers introduces a phase offset, such that mathematically the likelihood of complete tone erasure goes substantially to zero.

Howsoever, the use of imaginary number entries may require a certain degree of hardware complexity. In one embodiment of the invention, real numbers having a magnitude less than 1 have been found to be effective in preventing tone erasure. The use of real numbers has the effect of conserving hardware expenditure, because hardware may not have to process an imaginary component of an imaginary number. It has further been determined that the use of inverse powers of two (e.g. $1/(2^n)$) may reduce hardware complexity. One magnitude that has been found to be both effective in preventing tone erasure, yet minimizes hardware expenditure required for implementation is ½. This magnitude is also effective in reducing sidelobes, thus increasing notch depth.

The following equation is an embodiment of a linear transformation that can be effected by mapping logic 310 of transmitter 300. Matrix $[1\ -\alpha;\ -\alpha\ 1]$ is one embodiment of matrix M. Matrix $[c_{2n};\ c_{2n+1}]$ represents an embodiment of a pair of tones.

$$\begin{bmatrix} y_{2n} \\ y_{2n+1} \end{bmatrix} = k_{mod} \begin{bmatrix} 1 & -\alpha \\ -\alpha & 1 \end{bmatrix} \begin{bmatrix} c_{2n} \\ c_{2n+1} \end{bmatrix}, n = [0:N_D/2-1] \quad \text{[Eq. 2]}$$

This embodiment of matrix M is a matrix of real numbers which can be used for a linear transformation in accordance with embodiments of the present invention. This embodiment of matrix M illustrates the introduction of a scaling factor alpha ($\alpha$) to a matrix used to perform a linear transformation such that substantially antipodal signaling can be achieved and the transformation reversed at a receiver while reducing the probability of tone erasure. Scaling factor alpha is a real number. In some embodiments of the invention, alpha is a number having a magnitude other than one. In further embodiments of the invention, alpha ranges in magnitude from zero to one. In further embodiments of the invention, alpha can be dynamically varied.

While multiplying by a matrix to achieve a linear transformation so as to achieve antipodal signaling is done at a transmitter, in some embodiments, to properly receive and process an adjacent frequency coded waveform it may be necessary to apply the logical equivalent of the inverse of the applied matrix to corresponding tones at the receiver.

Figure 4:
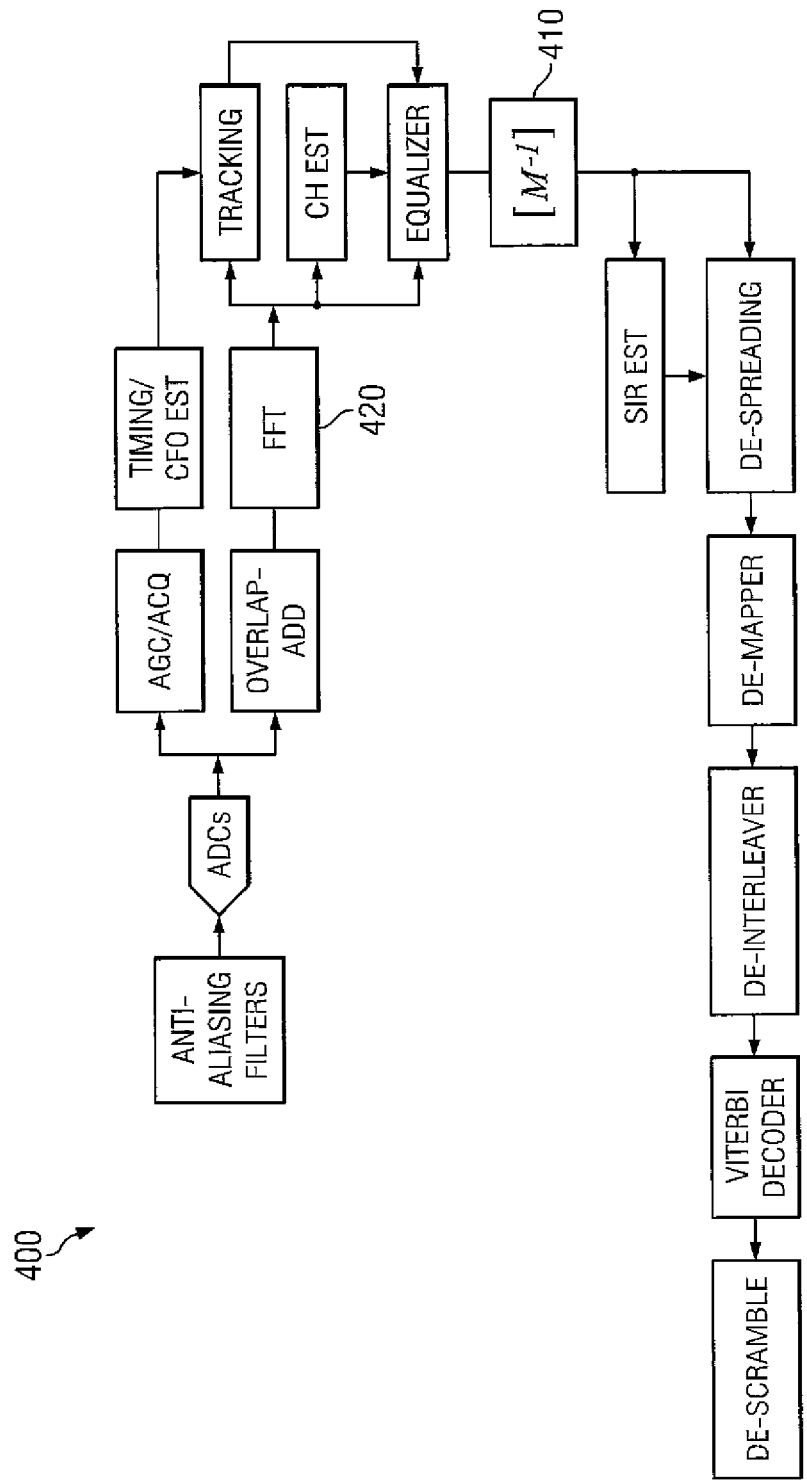
FIG. 4 is a block diagram of one embodiment of a receiver implemented in accordance with the present invention.

FIG. 4 illustrates a block diagram of an embodiment of a receiver 400 which may receive signals on which embodiments of the linear transformation discussed with regard to transmitter 300 have been performed. Mapping logic 410 of receiver 400 substantially reverses the linear transformation effected by mapping logic 310 of transmitter 300. A signal transmitted by transmitter 300 is received at receiver 400. At receiver 300, Fast Fourier Transform (FFT) 420 is performed on the received signal. Subsequent to the application of FFT 420, mapping logic 410 is applied to tones of the received signal such that the linear transformation effected by mapping logic 310 is substantially reversed. As a result, the inverse mapping is substantially undone. Because, in this embodiment, the linear transformation effected by mapping logic 410 occurs subsequent to FFT 420, the reversal of inverse mapping can be considered to occur in the frequency domain.

In some embodiments of the receiver, mapping logic 410 substantially reverses the linear transformation of mapping logic 310—expressed as matrix M—by applying a corresponding linear transformation, which, when expressed in matrix form, is substantially the inverse of matrix M, i.e. $M^{-1}$. In some embodiments of a receiver, for performance purposes, it may be preferable to implement the inverse transformation as an integral part of the signal demapping by applying logic implementing an embodiment of the following equation.

For received signals:

$$z_1 = h_1 y_1 + n_1$$

$$z_2 = h_2 y_2 + n_2$$

$$LLR_1 = \log\left[\frac{e^{-[(z_1-h_1)^2+(z_2-h_2)^2]/2\sigma^2} + e^{-[(z_1-3h_1)^2+(z_2+3h_2)^2]/2\sigma^2}}{e^{-[(z_1+h_1)^2+(z_2+h_2)^2]/2\sigma^2} + e^{-[(z_1+3h_1)^2+(z_2-3h_2)^2]/2\sigma^2}}\right] \quad \text{[Eq. 3]}$$

$$LLR_2 = \log\left[\frac{e^{-[(z_1-h_1)^2+(z_2-h_2)^2]/2\sigma^2} + e^{-[(z_1+3h_1)^2+(z_2-3h_2)^2]/2\sigma^2}}{e^{-[(z_1+h_1)^2+(z_2+h_2)^2]/2\sigma^2} + e^{-[(z_1-3h_1)^2+(z_2+3h_2)^2]/2\sigma^2}}\right]$$

This equation can be effected in mapping logic 410 to substantially recover tone data from a received signal.

Depending on the linear transformation, it may be desirable to scale either the matrix or entries of the matrix (e.g. to achieve a non-zero determinate) at the transmitter. In some embodiments of a receiver, it may be desirable to scale either the inverse matrix or entries of the inverse matrix at the receiver. This scaling can be done to increase signal power or allow a receiver to capture and process transmitted data.

In one embodiment, transmitter 300 and receiver 400 depicted in FIGS. 3 and 4 may generally adhere to the WiMedia Specification, and in certain embodiments, only logic, circuitry or a matrix multiplier may need to be added to a transmitter or receiver to enable antipodal signaling and sidelobe reduction. In one embodiment of the invention, at the transmitter, pilot tones are inserted into a signal after a linear transformation has been applied to tones comprising the signal. In one embodiment of the invention, at the receiver, pilot tones are removed from a signal prior to undoing an inverse mapping.

Figure 5:
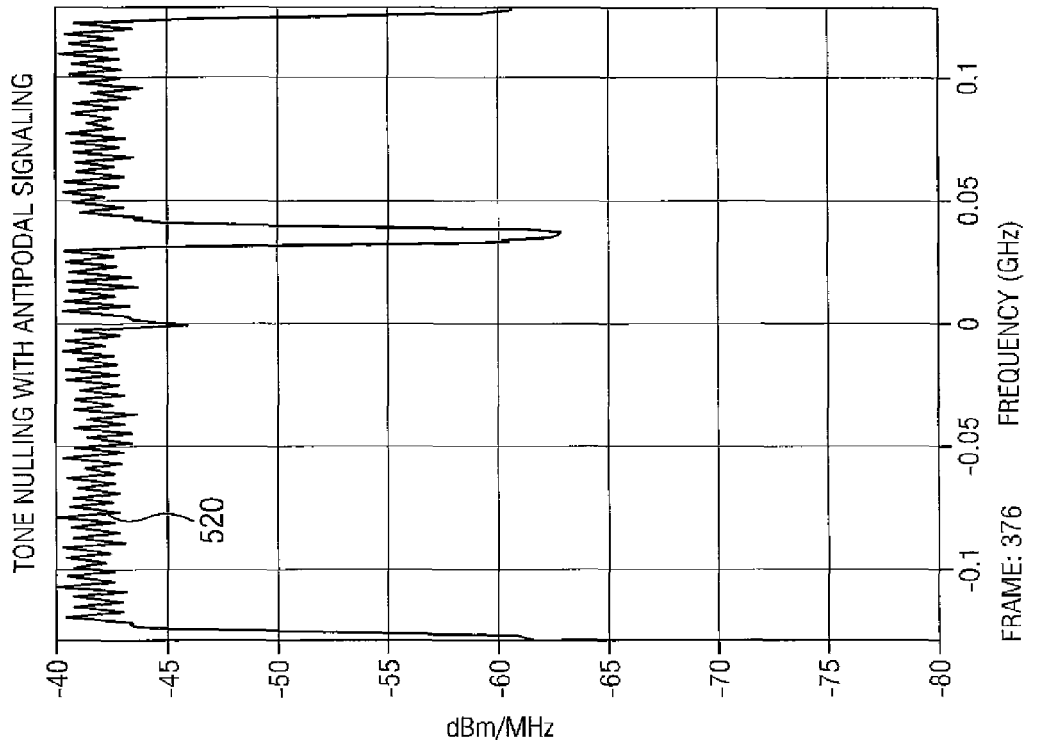
FIG. 5 is a graphical representation of a power spectral density of a UWB signal.
Figure 5:
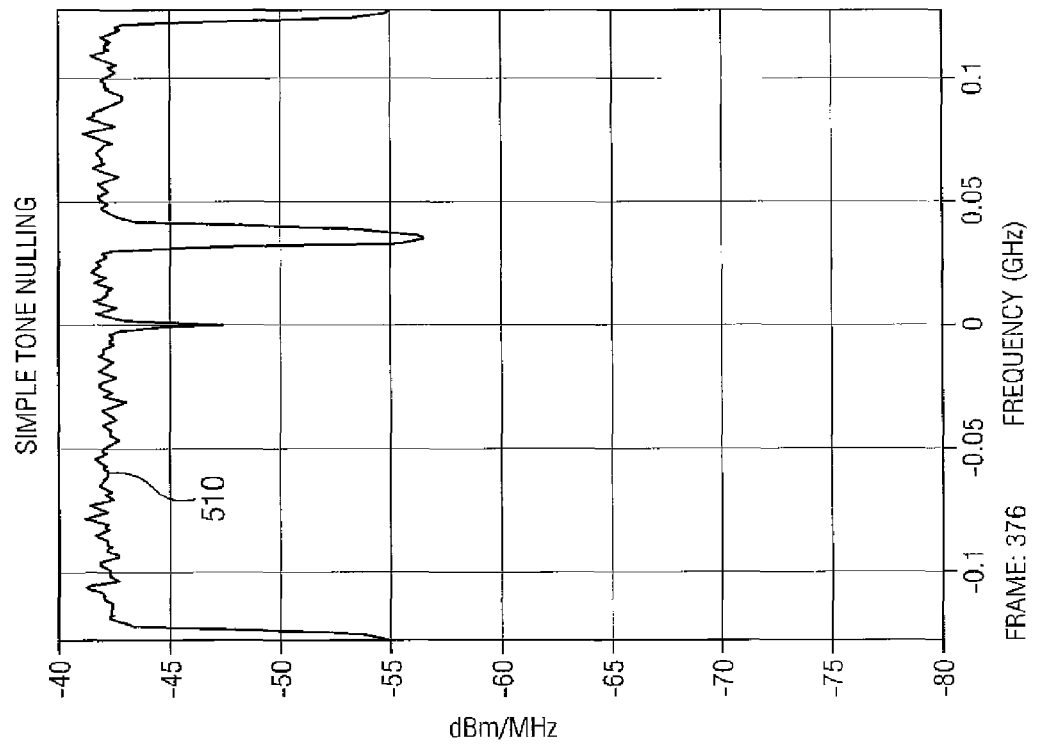

FIG. 5 is a comparison of notching with and without sidelobe suppression. From trace 510 it can be seen that tone nulling by itself can produce a notch depth of approximately 13 dB. Trace 520 of FIG. 5 depicts the efficacy of spectral shaping through using antipodal signaling as described with respect to embodiments of the systems and methods of the present invention described herein. From trace 520 it can be observed that a notch depth of approximately 20 dB may be achieved using antipodal signaling. Depending on the embodiment and the scaling factors used to effect a linear transformation, greater notch depth can also be achieved. Additionally, as described above, this increased notch depth may be accomplished by antipodal signaling methods which can be used in accordance with or integrated into the WiMedia Specification. As an additional benefit, antipodal signaling techniques as described above are straight forward to implement and do not greatly increase hardware complexity.

Figure 6:
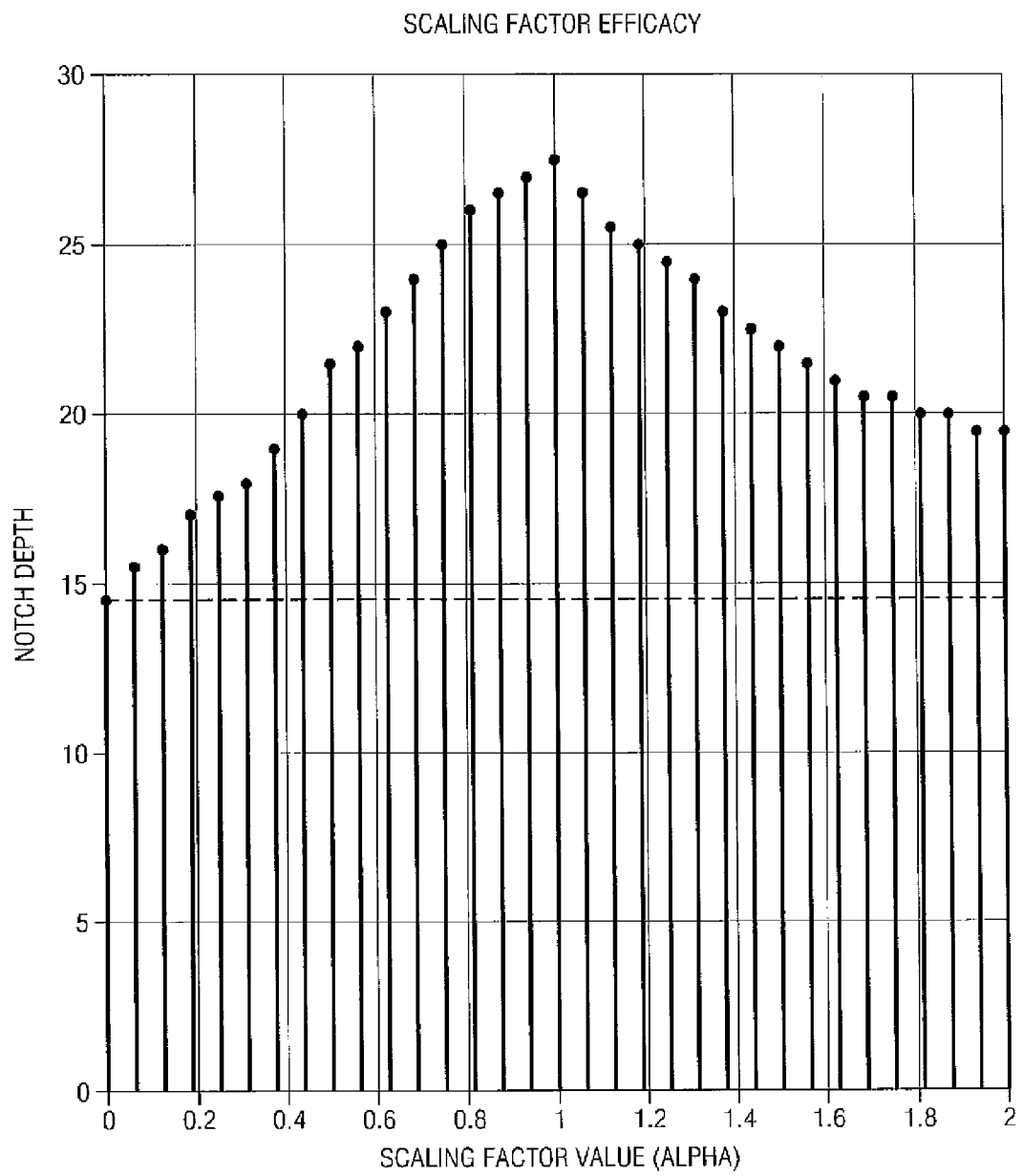
FIG. 6 is a graphical representation of the relationship between notch depth and matrix parameters.

FIG. 6 depicts the relationship between the choice of scaling factors (as described above) and the approximate notch depth which may be achieved. Notice that as the scaling factor approaches one, notch depth is increased.

Figure 7:
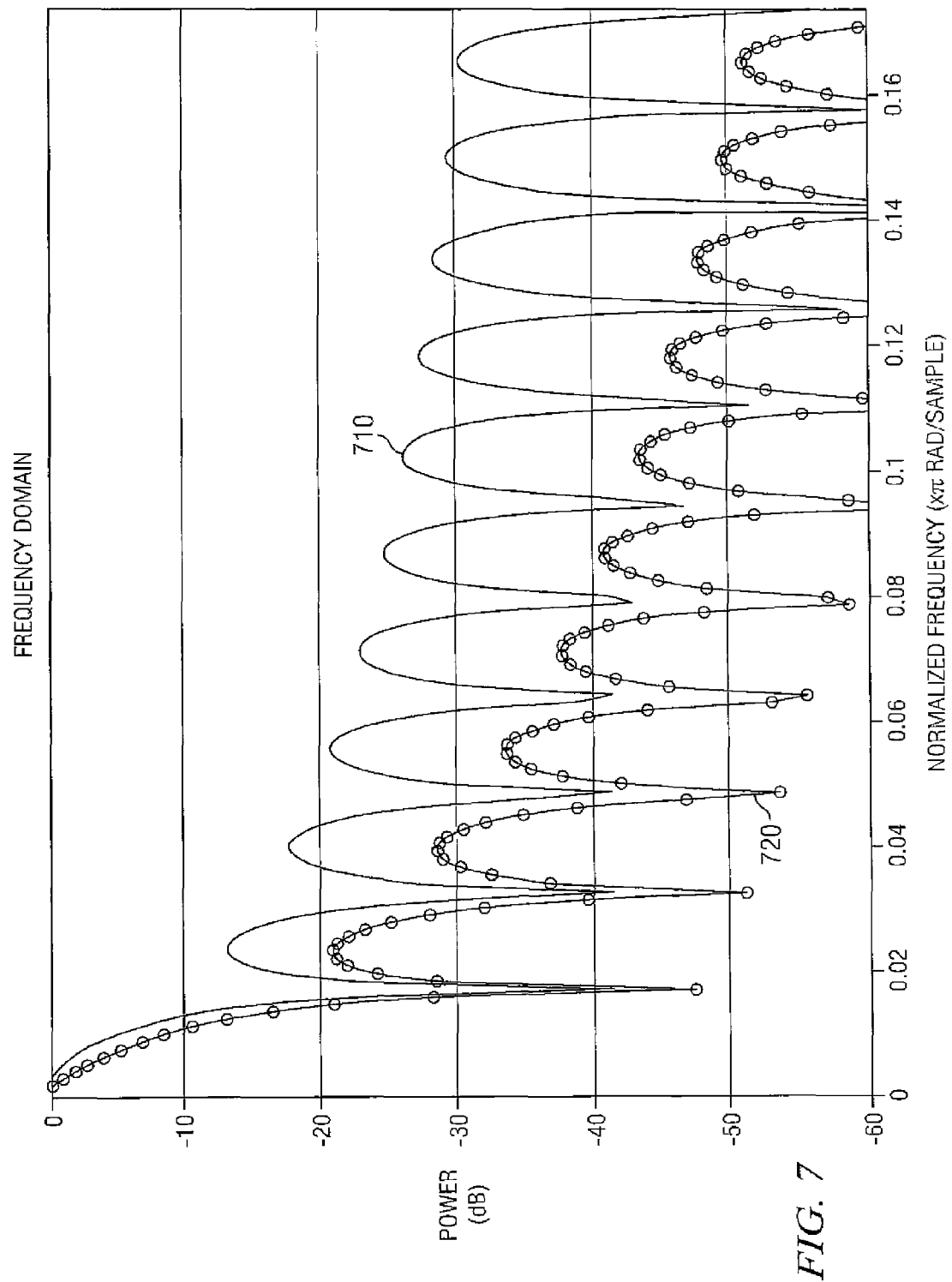
FIG. 7 is a graphical representation of the effect of antipodal signaling on sidelobe power.

FIG. 7 depicts a graph of the sidelobe suppression which may be achieved by embodiments of antipodal signaling. Trace 720 represents a signal whose sidelobes have been reduced through the use of antipodal signaling according to an embodiment of the present invention. Trace 710 represents a signal upon which no sidelobe reduction techniques have been performed. As is apparent from a comparison of the traces, the sidelobe power of trace 720 is appreciably reduced relative to trace 710. An additional benefit of antipodal signaling apparent from the graph is that the sidelobe power of trace 720 diminishes to zero appreciably faster than trace 710 as the distance from the center frequency of the mainlobe increases.

In some embodiments, the rapid diminishment of sidelobe power towards zero is an important aspect of enhancing the effectiveness of notching because not only is the power of the sidelobes resonating in the notch reduced, but the number of tones having sidelobes which materially contribute to the power within the frequency range of the notch are also reduced, thus limiting the number of tones which have the potential to interfere with other signals in a notched range of frequencies. Another benefit of swifter diminishment of sidelobe power to zero is the reduction in the number of tones that can materially interfere with the mainlobe of any one tone because the frequency range over which the sidelobes of any one tone can materially affect the mainlobe of another tone is diminished, thus reducing the total number of tones that have the potential to materially interfere with any one tone.

In the foregoing, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention. For example, though the above embodiments have been described with respect to UWB radio, it will be apparent that the same systems and methods will apply equally well to other frequency ranges and other types of radios and transmission and reception techniques.

Embodiments of the invention disclosed herein can be implemented by programming one or more computer systems (e.g., microcontrollers, digital signal processors, etc.) and devices (e.g., Programmable Read Only Memory (PROM), Random Access Memory (RAM), etc.) with computer-executable instructions embodied in a computer-readable medium. When executed by a processor, these instructions operate to cause these computer systems and devices to perform one or more functions particular to embodiments of the invention disclosed herein (e.g., apply a linear transformation to one or more tones, map one or more tones, invert one or more tones, demap a linear transformation, etc.). Programming techniques, computer languages, devices, and computer-readable media necessary to accomplish this are known in the art and thus will not be further described herein. Embodiments of the invention and components of the invention disclosed herein can be implemented in hardware.

It should further be noted that while the above embodiments have generally been discussed with regard to a two by two matrix, matrices with other dimensions can be used. In some embodiments, however, the matrix used must be invertible.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method of reducing sidelobes in a Ultra-Wideband (UWB) signal, comprising:
   generating a plurality of tones by the transmitter;
   mapping one or more of the plurality of tones such that an inverted tone is adjacent to a non-inverted tone using a first matrix; and
   forming a Ultra-Wideband (UWB) signal using the plurality of tones.

2. The method of claim 1, wherein the entries in the first matrix have a magnitude less than or equal to 1.

3. The method of claim 2, wherein the magnitude is approximately an inverse power of two.

4. The method of claim 1, wherein the first matrix is a two by two matrix.

5. The method of claim 4, wherein every entry in the first matrix not on a main diagonal of the first matrix is negative.

6. The method of claim 1, wherein the first matrix is an invertible matrix.

7. The method of claim 1, further comprising receiving the UWB signal and demapping the inverted tone, wherein demapping the inverted tone comprises mapping tones using a second matrix, wherein the second matrix is substantially the inverse of the first matrix.

8. The method of claim 1, further comprising receiving the UWB signal and demapping the inverted tone.

9. The method of claim 8, wherein demapping the inverted tone comprises using a decoder.

10. A system capable of shaping the power spectrum of a UWB signal, comprising:
    a transmitter configured to:
      generate a plurality of tones;
      map one or more of the plurality of tones such that an inverted tone is adjacent to a non-inverted tone using a first matrix; and
      form a UWB signal using the plurality of tones.

11. The system of claim 10, wherein the entries in the first matrix have a magnitude less than or equal to 1.

12. The system of claim 11, wherein the magnitude is approximately an inverse power of two.

13. The system of claim 10, wherein the first matrix is a two by two matrix.

14. The system of claim 13, wherein every entry in the first matrix not on a main diagonal of the first matrix is negative.

15. The system of claim 10, wherein the first matrix is an invertible matrix.

16. The system of claim 10, further comprising:
    a receiver configured to:
    receive the UWB signal; and
    demap the inverted tone using a second matrix, wherein the second matrix is substantially the inverse of the first matrix.

17. The system of claim 1, further comprising:
    a receiver configured to:
    receive the UWB signal; and
    demap the inverted tone.

18. The system of claim 17, wherein the receiver is further configured to demap the inverted tone using a decoder.

19. A non-transitory computer readable medium comprising a set of computer instructions, said set of computer instructions executable to:

generate a plurality of tones;

map one or more of the plurality of tones such that an inverted tone is adjacent to a non-inverted tone using a matrix; and form a UWB signal using the plurality of tones.

20. The non-transitory computer readable medium of claim 19, wherein the entries in the matrix have a magnitude less than or equal to 1.

21. The non-transitory computer readable medium of claim 20, wherein the magnitude is approximately an inverse power of two.

22. The non-transitory computer readable medium of claim 19, wherein the matrix is a two by two matrix.

23. The non-transitory computer readable medium of claim 22, wherein every entry in the matrix not on a main diagonal of the matrix is negative.

24. The non-transitory computer readable medium of claim 19, wherein the matrix is an invertible matrix.

* * * * *